(No Model.)

J. KELLY.
COUPLING FOR PROPELLER AND OTHER SHAFTS.

No. 292,823. Patented Feb. 5, 1884.

Witnesses;
H. W. Well,
Rich'd A. Goldsbrough.

Inventor,
John Kelly,
per A. B. Upham,
Attorney in fact.

N. PETERS. Photo-Lithographer, Washington, D. C.

UNITED STATES PATENT OFFICE.

JOHN KELLY, OF PEORIA, ILLINOIS.

COUPLING FOR PROPELLER AND OTHER SHAFTS.

SPECIFICATION forming part of Letters Patent No. 292,823, dated February 5, 1884.

Application filed November 26, 1883. (No model.)

*To all whom it may concern:*

Be it known that I, JOHN KELLY, of Peoria, in the county of Peoria, in the State of Illinois, have invented an Improved Coupling for Propeller or other Shafts; and I do hereby declare that the following is a full, clear, and exact description thereof, reference being had to the annexed drawings, making a part of this specification, in which like letters of reference refer to like parts, and in which—

Figure 1:
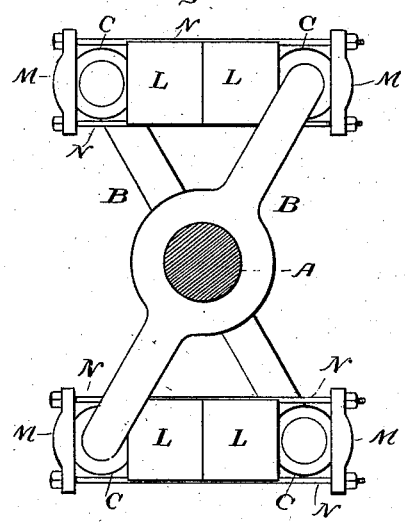
Figure 2:
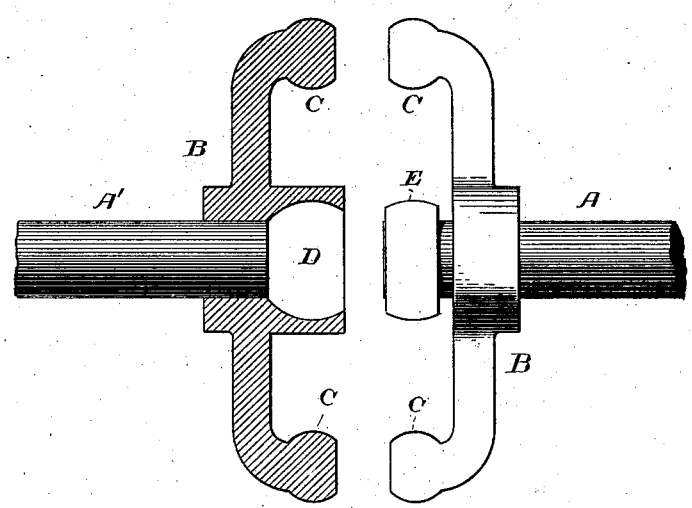

Figure 1 represents an elevation of the same; Fig. 2, side view of one pair of arms B, and longitudinal section of the other pair of arms.

The object of this invention is the construction of a coupling by which to secure together the contiguous ends of sections of shafting in such a way as to cause them to revolve unyieldingly together, and yet, if necessary, to permit more or less angular deflection between them. This coupling is intended, primarily, for the shafting in screw-propellers; but it is of equal applicability for the shafting in machine-shops, elevators, and elsewhere.

My invention consists, essentially, of ball-and-socket joints so arranged as to permit the desired angular deflection in the shafting, and still cause the two sections to turn together.

In the drawings, A and A' represent the neighboring ends of two sections of shafting which it is desired to couple together. B B are two arms fastened by keys or other device at each end of the sections of shafting, as shown in Fig. 2. At the ends of each of these arms B are formed, by casting therewith or otherwise fastened thereto, the spheres C C. D is a spherical socket formed at the center of one pair of arms B. E is a ring partly spherical upon its exterior surface, made in two or more sections, and fitting about the shaft A. L L are blocks having grooves L² in their sides, and spherical recess L' at one end of each. The caps M M are also furnished with spherical recesses, which are, as those in the blocks L, of the same radius as the spheres C.

In putting this coupling together, the ring E is first inserted into the socket D, its sectional formation permitting it. The ends of the shafting A A' are then brought together until the centers of all the spheres C are in the same plane at right angles to the shafts, the end of the shaft entering, of course, the ring E. The angle which the arms B make with each other is preferably about sixty degrees. Between each two spheres C C, one belonging to each arm B, are put two blocks, L L, the spherical recesses of the same clasping the spheres C. The caps M are then put against the opposite sides of said spheres, and held thereat by long bolts N, as shown in Fig. 1.

It is evident that in use the arms B, by either pushing or pulling through the blocks L, abut between the spheres C or the caps M through the bolts N holding said spheres from moving away from each other. The spherical form of the spheres C enables the arms to rock one with respect to the other, and thus allow a more or less angular deflection of the shafts, as though held together by a simple ball-and-socket joint. The wear between the spheres C and the blocks and caps L M is taken up by simply tightening up the nuts of the bolts N.

What I claim as my invention, and for which I desire Letters Patent, is as follows, to wit:

1. In a shaft-coupling, arms fast on the contiguous ends of sections of shafting, and provided with spherical knobs at their extremities, in combination with sockets clasping said knobs, and means for connecting the sockets of one set of knobs to the sockets of the other set, substantially as shown, and for the purpose described.

2. In combination with the sections of shafting A A', the arms B B, having spheres C C at their ends, the blocks L L, caps M M, and bolts N N, substantially as and for the purpose specified.

3. In combination with the sections of shafting A A', the arms B B, having spheres C, spherical socket D, ring E, blocks L, caps M, and bolts N, substantially as and for the purpose set forth.

In testimony that I claim the foregoing invention I have hereunto set my hand this 24th day of November, 1883.

JOHN KELLY.

Witnesses:
M. E. UPHAM,
JAS. M. MORSE.